Aug. 26, 1969 F. C. CHIANG 3,463,906

OPTICAL CARD READER

Filed April 6, 1965 2 Sheets-Sheet 1

INVENTOR.
FRANKLIN C. CHIANG

BY

Lippincott, Ralls & Hendricson
ATTORNEYS

Aug. 26, 1969 F. C. CHIANG 3,463,906

OPTICAL CARD READER

Filed April 6, 1965 2 Sheets-Sheet 2

INVENTOR.
FRANKLIN C. CHIANG

BY

Lippincott, Ralls & Hendricson
ATTORNEYS

United States Patent Office 3,463,906
Patented Aug. 26, 1969

3,463,906
OPTICAL CARD READER

Franklin C. Chiang, Palo Alto, Calif., assignor to Hewlett-Packard Company, a corporation of California Filed Apr. 6, 1965, Ser. No. 445,975
Int. Cl. G06k 7/10
U.S. Cl. 235—61.11 13 Claims

ABSTRACT OF THE DISCLOSURE

Input and output card drive rollers are supported above a transport bed by guides spaced apart substantially the width of the data cards. The output card drive rollers are driven at a slightly greater surface velocity than the input card drive rollers to tension a data card flat against the transport bed as it is driven past an optical reader including a row of data photosensors. A control circuit is responsive to a pair of edge detecting photosensors for electrically energizing the data photosensors only while the data card is driven through the data reading zone of the transport bed. Another photosensor may be employed for detecting a missing corner of the data card to indicate whether or not the data card is being driven in the appropriate orientation through the data reading zone. Alternatively, coincidence circuitry responsive to the data and edge detecting photosensors may be employed for indicating the orientation of a position coded data card as it is being driven through the data reading zone and for providing a correct indication of the data on the data card for any orientation in the reading zone.

The present invention relates to an improved optical reader for marked or punched cards that are commonly employed in data storage. The present invention is adapted to produce output signals representative of data stored upon cards either by punches or marks thereon, and to obviate prior art limitations and difficulties connected with possible leading and trailing edge signals and reading errors resulting from card inversion or reversal.

One manner of storing data for utilization in data processing is to punch or mark cards in a manner representative of the data to be recorded and retained. In this type of data handling, there is normally employed some type of card reader for retrieving information recorded upon the cards and a common type of card reader employs the light-transmitting or reflective properties of holes or marks, respectively, applied to the cards. The present invention relates to optical card readers, wherein a light source is provided on one side of a reading zone and cards passing therethrough are "read" by photoresponsive devices receiving light pulses from light passing through card holes or reflected from card marks. Inasmuch as improvements afforded by the present invention are equally applicable to punched or marked cards, the following description of the present invention is referenced primarily to punched cards, although it is to be appreciated that the invention is equally applicable to cards containing reflective marks thereon as well as punched holes.

The present invention, in brief, provides for gripping data cards or punched cards, as they are hereinafter termed, and passing them through a reading zone of the optical reader of the invention while maintaining the card flat and in longitudinal alignment with the card transport means hereof. The reader provides a particular relationship between the dimensions of punched holes in a card and the size of optical paths to photoresponsive devices of the reader, so as to preclude inadvertent energization of improper photoreceptors during card passage through the reader. Additionally, the present invention provides an improved and simplified leading and trailing edge detector for punched cards to preclude the generation of spurious pulses at card entry and exit without the necessity of employing pulse separating circuitry. Furthermore, the present invention provides for the generation of the same data pulses whether the card is inserted right side up or right side down. In addition to these features, the invention provides for the identification of reverse card entry into the reader and control of reading in either ascending or descending mode of the card address.

Inasmuch as the storage of data by punches or marks on a card is accomplished by the particular location of same, it is, of course, necessary to read the card in the same manner as the punches are applied, in order to retrieve the information stored upon the card. Inversion of a card placed into a conventional card reader causes a relocation of the card punched holes, insofar as the reader is concerned, and, consequently, normally produces data pulses which are not properly related to the data stored on the card. While it is conventional in data processing to employ card handling equipment and possibly even visual card checking to insure that all cards are identically oriented, it is always possible for one or more cards to be inverted or inadvertently reversed in a stack. While it is possible to guard against these occurrences, considerable equipment may be involved therein, and failure to insure identical orientation of all cards normally results in complete failure of data processing carried out with any number of cards containing a single disoriented card. Consequently, the importance of insuring proper card reading cannot be overemphasized.

Although the following invention is referenced to a single, preferred embodiment, it is not intended to limit the invention by the terms of the following description nor the details of the accompanying drawings. A single, preferred embodiment of the present invention is illustrated in the accompanying drawings, wherein.

Figures 1, 2A, 2B, 3:
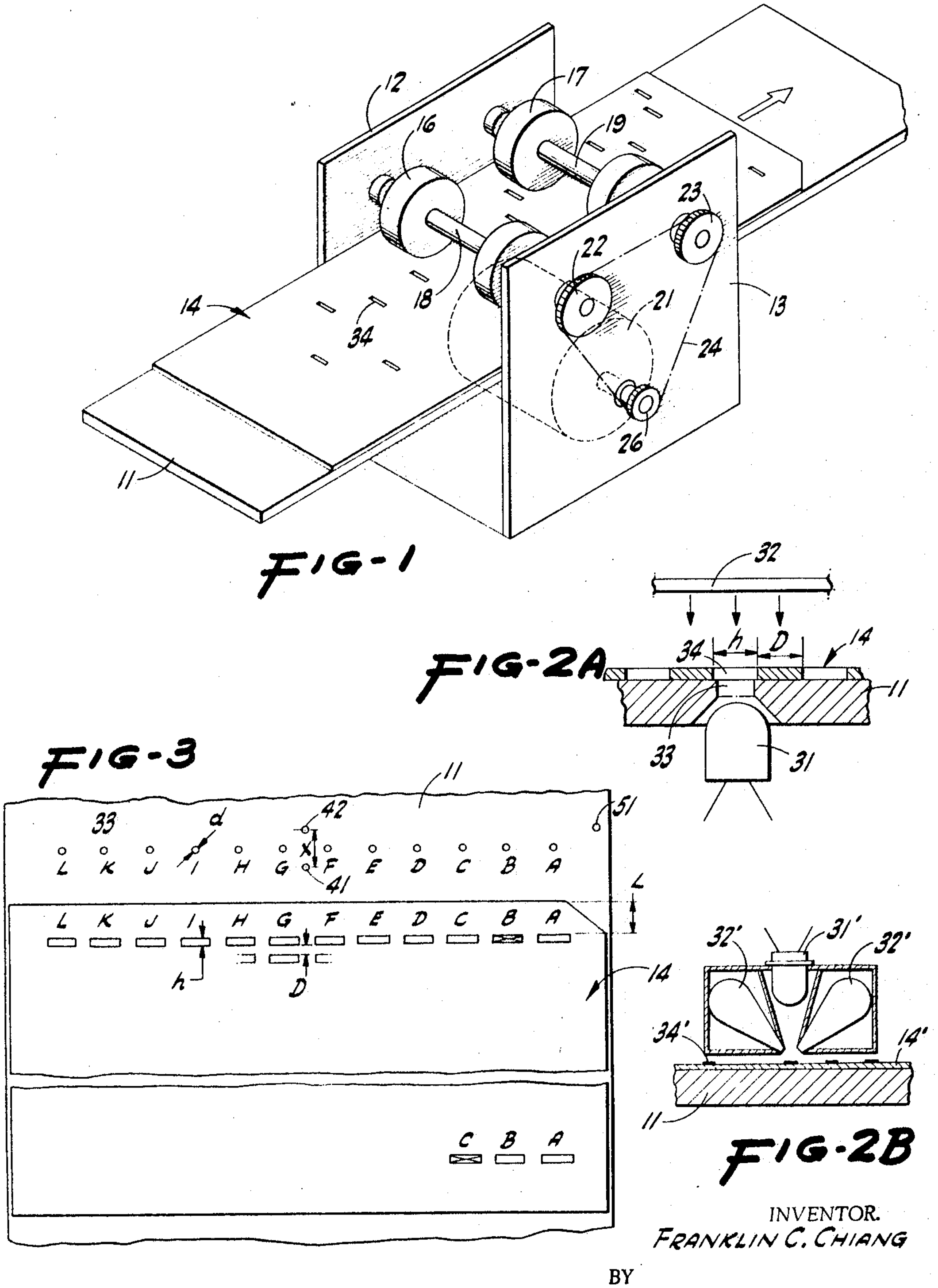
FIGURE 1 is a perspective view schematically illustrating the mechanical configuration of the card reader of the present invention.
FIGURE 2A is a partial, sectional view showing the relationship of a punched card to a photoreceptor and light source of the reader of this invention.
FIGURE 2B is a partial, sectional view showing a head for reading reflected light.
FIGURE 3 is a schematic representation in plan view of a card entering the reading zone of the optical reader of this invention.

Considering now a single, preferred embodiment of the present invention and referring to FIGURES 1 and 2A hereof, there will be seen to be shown an optical reader including an elongated bed 11 and side walls 12 and 13. A punched card 14 is adapted to be placed upon the transport bed 11 and moved through the reader between the side walls with card reading occurring in an enclosed zone between these side walls. The transport bed 11 has a width substantially equal to that of punched cards, so that a card passing through the reader is maintained in longitudinal alignment with the transport bed and cannot rotate to become askew with the bed. Movement of the card along the bed is herein accomplished by the provision of two sets of rollers 16 and 17 disposed above the bed between the side walls and carried by axles 18 and 19, respectively, The rollers are so dimensioned and mounted so as to press against a punched card inserted in the card reader, and the sets of rollers are forcibly rotated so as to consequently draw a punched card along the transport bed through the reader. The individual rollers of the sets may be formed with gripping edges to positively engage punched cards, and drive means, such as a small electric motor 21 is employed to rotate the roller axles 18 and 19, so as to forcibly rotate these rollers. As viewed in FIGURE 1, the rollers are rotated in a counterclockwise direction, and the present invention provides for rotating the second or output set of rollers 17 at a slightly greater rate than the input rollers 16. This is herein accomplished by the provision of pulley wheels 22 and 23 at the ends of axles 18 and 19, respectively, and a belt 24 extending about these pulley wheels and about a pulley wheel 26 at an end of the motor shaft. The second pulley wheel 23 is made slightly smaller in diameter than the first pulley wheel 22, and, consequently, the motor 21 will rotate the second set of rollers 17 slightly faster than the first set 16. This relationship between the rate of rotation between the two sets of rollers is herein provided to insure maintenance of the punched card in flat engaging relationship with the reader bed 11 as the card passes through the reader. The punched card is actually tensioned by the second set of rollers pulling the card at a slightly greater rate than the first set, so that there is no possibility of the card buckling or failing to lie flat upon the reader bed as it passes through the reading zone between side walls 12 and 13. In this manner, the present invention guards against the possibility of light being transmitted through a punched opening in a card and energizing any photoreceptor besides the one which should be energized from the stated punched opening.

Optical reading of punched cards passing through the present invention is accomplished by the provision of a plurality of photoreceptors or photosensors 31 disposed in a row laterally across the optical reader bed 11 between the sets of rollers 16 and 17. The photosensors may take a variety of forms; however, light-sensitive semiconductor devices are advantageous. Thus an NPN silicon light sensor may be used with a positive voltage applied to the collector and the base oriented to receive light. Such a device has a diameter of the order of .06 inch and is thus well suited for this application. For reading punched cards, there is provided a light source 32 above the bed directing light downwardly upon cards passing through the reader and a row of data apertures 33 are spaced evenly apart laterally across the bed between the sets of rollers, with a photosensor 31 beneath each aperture. As shown in FIGURE 2A, a punched card 14 passing over the bed 11 will intermittently dispose a punched hole 34 of the card above a data aperture 33, so that light from the source 32 will pass through the card hole 34 and data aperture 33 to impinge upon the photosensor 31. The individual data apertures and associated photosensors of the reader and disposed in position across the reader bed in laterally displaced positions corresponding to the possible positions of punched openings in the data card 14 passing through the reader. The data apertures are aligned in columns so that a punched card passing through the reader will be read one transverse column at a time as the punched openings in that column move over the row of data apertures.

The data photosensors and light source are positioned on the same side of the bed for reading reflected light, as from marked cards. As shown in FIGURE 2B, photosensors 31' are placed above the bed viewing marks 34' on a card 14' passing over the bed. One or more light sources 32' are also positioned above the bed to direct light only on a very narrow strip across the card so that the photosensors are activated in ascordance with the reflectively of light to vary the signals from the photosensors as an identification of data marks. Also, punched holes in cards will produce a variation in light reflection so this arrangement may be employed with punched cards.

In accordance with the present invention, the individual photosensors of the reader are gated so as to be receptive to incident light only under certain circumstances. In this respect, it is noted that with an appropriate voltage applied to the photosensors, incident light will produce an output signal therefrom, and it is in this manner that electrical signals are produced in photosensors corresponding to the location of punched openings in a card passed through the reader. Under the circumstances wherein no card is in the reader, it will be appreciated that the data apertures are open so that light passes therethrough to fall upon the photosensors to normally produce output signals. While it is possible to filter out these signals, the present invention proceeds in an alternative manner by turning off the photosensors in the absence of a card passing through the reader. Reference is made to FIGURE 3 of the drawing illustrating the leading and trailing edge of a punched card disposed upon the transport bed 11 of the reader and approaching the row of data apertures 33. The punched card 14 is provided with successive transverse columns of punched locations, and generally there are provided twelve possible punch openings in each column. In FIGURE 3, these locations are identified by the letters A to L reading from right to left in the figure. In the interest of simplicity, the data apertures of the reader and corresponding photosensors are hereinafter also identified by these same letters corresponding to the lateral location of punched openings in a card passing through the reader.

In order to prevent the generation of a light pulse in the absence of a card within the reader covering the row of data apertures, the present invention provides a pair of edge detection apertures 41 and 42 located one on each side of the row of data apertures. These detection apertures are disposed out of longitudinal alignment with the data apertures, so that they can under no circumstances become aligned with punched holes in a data card passed through the reader. Each of these detection apertures 41 and 42 extends through the reader bed 11 in the same manner as the data apertures described above, and each is backed by photosensors, herein identified as 41P and 42P. As the card 14 moves along the reader bed 11 the leading edge thereof will first cover the detection aperture 41 and will then pass over the row of data apertures 33 and subsequently will pass over the second edge detector aperture 42. The present invention operates to maintain the data photosensors inoperative until the leading edge of the punched card 14 passes over both of the detection apertures 41 and 42. In this manner it is not possible for the data photoreceptors to produce output signals before they are covered by a punched card.

Figure 4:
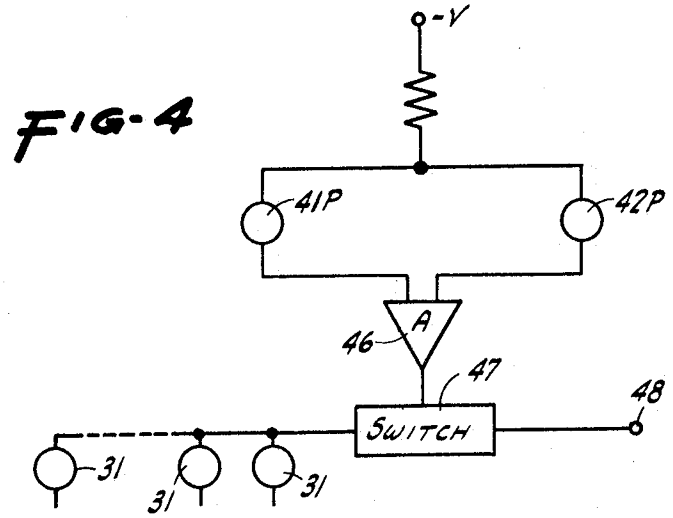
FIGURE 4 is a schematic circuit diagram of a corner cut detection and control circuit.

The circuit of FIGURE 4 may be employed to gate the data photosensors in accordance with the presence or absence of a card covering same. In this illustration the photosensors are only schematically depicted. As shown in FIGURE 4, the photosensors 41P and 42P may be connected in parallel with a voltage —V coupled through a resistor to one side of each receptor and the outputs of each receptor connected to the input of an amplifier 46. The output of this amplifier is connected to control a switch 47 connecting a power supply 48 to the data photoreceptors 31. In actual practice, the element identified as an amplifier 46 in the circuit, may comprise a single transistor having the outputs of the two detection photoreceptors 41P and 42P applied to two terminals thereof, and the other terminal being connected to a transistor-emitter follower 47 serving as a switch in the circuit. Conduction of either of the detection photoreceptors then causes a negative voltage to be applied to the element 46 wherein it is inverted and applied to the data photoreceptors 31 to maintain same inoperative. Covering of both detection apertures 41 and 42 causes each of the photosensors associated with these two apertures to produce no output signals so that supply voltage is applied to the data photoreceptors, or to amplifiers thereof, so that activation of the photosensors by incident light produces useable signals.

As the punched card passes through the reader hereof and the trailing edge of a card approaches the row of data photoreceptors 31, it will first pass over the detection aperture 41 so that light enters this aperture to operate the photosensor 41P associated therewith, and consequently de-energize each of the data photosensors 31. In order to insure operation of the reader hereof for all columns of punched apertures on a card 14, it is herein provided that the distance from the leading edge of the card to the first column of apertures is greater than the separation between the detection apertures 41 and 42. More specifically, the distance L in FIGURE 3 between the leading edge of the card and the leading edge of the first column of punched openings in the card is made greater than the distance X between the detection apertures 41 and 42. In practice, it has been found that a convenient relationship between these dimensions is given by the relationship $X=.90L$. It is also necessary for the detection apertures to be disposed one in each side of the row of data apertures in order that the second detection aperture 42 cannot be covered by the leading edge of the card before the data apertures are also covered thereby.

In addition to edge detection gating, described above, the present invention provides for detection of the end of the card first entering the reader. Inasmuch as conventional punched cards of the type herein described have a corner of the leading edge thereof removed, as indicated in FIGURE 3, it is possible to employ this missing corner to determine whether or not the card is inserted in the reader in proper position for normal reading. A corner detection aperture 51 may be provided through the reader bed with a photosensor located in alignment therewith beneath the bed, so that light from the source 32 normally passes through this corner detection aperture and is only cut off when the card is passed sufficiently into the reader to cover the aperture. Proper insertion of the card in the reader will cause the leading edge of the card to first cover the detection apertures 41 and 42, while momentarily leaving the corner detection aperture uncovered because of the missing corner of the leading edge of the card. Reverse entry of the card will cause the edge detection aperture 42 and corner detection aperture 51 to be substantially simultaneously covered because there is no missing corner on the then front edge of the card as it passes through the reader. The photosensor associated with the corner detection aperture may thus be employed in conjunction with the edge detection photosensors to gate the data photosensors or merely to indicate that a card has been improperly passed through the reader so as to preclude the erroneous reading of information from a card.

A difficulty that occurs with conventional optical card readers is the production of erroneous signals from light inadvertently falling upon a particular data photosensor. This can occur by the data card being buckled or curved so that light passing through a data punched hole therein can spread out to energize more than one photosensor. Additionally, it sometimes occurs that light passing through a punched hole will energize the wrong photosensor if the card is slightly askew, and possibly for other reasons. The present invention precludes this type of error in the reading of punched cards in the manner described above, and by the limitation upon the size of data apertures 33 in the reader bed. In accordance with the present invention, these data apertures 33 are formed as circles with a diameter which is less than the width or narrow dimension of punched holes in the card 14. Also, the diameter of the data apertures is made much less than the separation between adjacent punched holes in the cards. More particularly, the diameter $d$ of the data apertures 33 is made less than the width $h$ of punched holes in the card 14 and less than the distance D between adjacent columns of punched holes in the card. This is illustrated in FIGURES 2A and 3. One practical embodiment of the invention provides that $d=90\%\ h$. Gated operation of the data photosensors of the present invention is accomplished by the edge detecting photosensors as discussed above, the corner detector, also discussed above, and it may also be accomplished by particular circuitry of the data photosensors themselves to employ particular punches formed in the first and last columns of the card, as described below.

Figure 5:
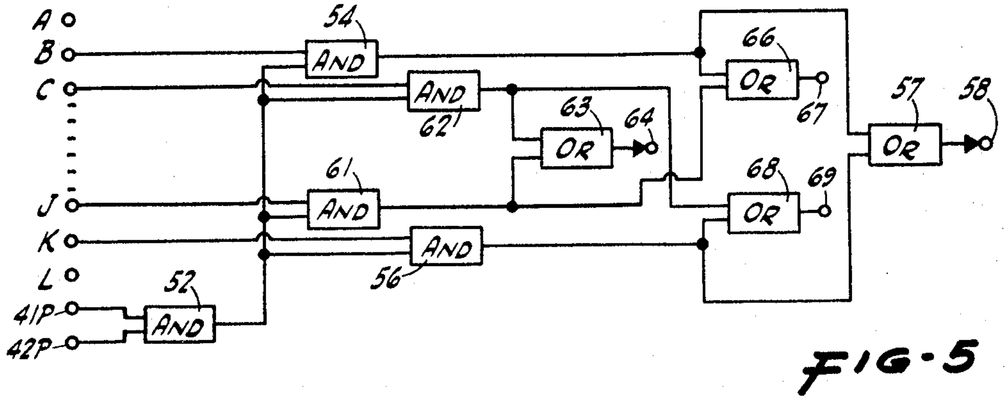
FIGURE 5 is an electrical diagram of gating control circuitry of the present invention.
Figure 6:
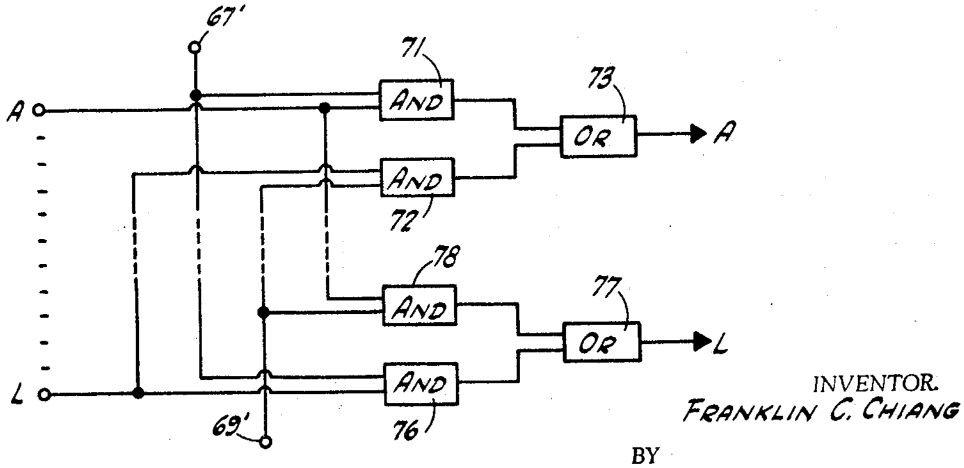
FIGURE 6 is a partial electrical diagram illustrating connections for reading of a punched card, either right side up or upside down.

A preferable manner of insuring proper card reading regardless of card orientation is illustrated in FIGURES 3, 5 and 6. As shown in FIGURE 3, a single position may be punched or marked in any one predetermined location of the first column of the card, as at B. With no other openings provided in the first column of the card, this punched hole at B will cause energization of the B data photosensor if the card is inserted right side up. On the other hand, if the card is inverted, this same punched opening will be aligned with data photosensor K to energize it. It is noted in this respect that the location of punched holes in the card are symmertical about the center of the card, so that turning the card over will place the punched opening above the corresponding data photosensor on the other side of the centerline of the reader. Signals produced by this single punched opening in the card, as at B, are then employed to indicate whether or not the card is inserted right side up or upside down, and also may be employed to control the reader so as to produce the same data readings whichever way the card is inserted. Circuitry of the invention for accomplishing reading of the card, whether inserted right side up or upside down, is described below and illustrated in FIGURES 5 and 6. One additional error of card insertion can occur, as noted above, and that is for the card to be reversed as it is inserted. In this instance, the last column of punch locations of the card will first enter the reader. Inasmuch as the rear edge of the card does not have a corner cut, the above-described corner cut detector may be employed to indicate that the card is reversed. However, it does not indicate whether the card is inverted. In order to provide this information to the reader, any single location in the last column of the card is punched out that is not aligned with the first row punch or its complement. In this example, C is punched. It will then be seen that with the card right side up and reversed, this punched opening will pass over data photosensor J, but with the card reversed and inverted, it will pass over data photosensor C. Signals obtained from these data photosensors are employed to indicate the card orientation if desired, and to control the reader so as to read the card in the orientation it is inserted.

Reference is made to FIGURES 5 and 6 illustrating circuitry of the present invention suitable for gating and controlling the data photosensors for the reading of data cards inserted in any manner into the optical reader hereof. Only certain of the data photosensors are illustrated, inasmuch as other photosensors are not involved in this control provided by the present invention. In FIGURE 5, there are shown certain of the data photosensors, together with edge detector photosensors 41P and 42P. The edge detector photosensors are schematically illustrated as being connected to the inputs of an AND circuit 52, so that an output appears therefrom only when these two photosensors are covered by a card, as described above.

With a punched card having the B location punched in the first column and the C location punched in the last column, a signal at the B photosensor is indicative of the card being inserted frontwards and right side up, and thus photosensor B is connected to oen input of an AND circuit 54 having the other input supplied by the output of the edge detector AND circuit 52. If the card is inverted, the opening punched at the B location of the first column of the card will pass over the K photosensor to energize it, and this photosensor is connected to an AND circuit 56 having the other input thereof provided by the output of the edge detector AND circuit 52. The outputs of these two AND circuits 54 and 56 are both indicative of the card being inserted with the proper edge forward, and thus the output of each of these AND circuits is connected to the input of an OR circuit 57 having an output appearing at a terminal 58 to provide for reading of the card address in ascending order.

A reverse insertion of a punched card right side up will cause the punched holes at C of the last column of the card to pass over data photosensor J, and thus photosensor J is connected to an AND circuit 61 having the other input provided by the output of the edge detector AND circuit 52. Consequently, an output from the AND circuit 61 is indicative of the card being face up. Should the card be inserted in reverse and inverted position, the punched opening at C of the last column of the card will pass over the C photosensor, and this photosensor is connected to one input of an AND circuit 62 having the other input provided by the output of the edge detector AND circuit 52. The outputs of the C and J AND circuits 61 and 62 are applied as inputs to an OR circuit 63 providing a signal to a terminal 64 controlling the reader to read the data card address in descending order.

As previously noted, the outputs of B AND circuit 54 and J AND circuit 61 are both indicative of the card being inserted face up, and, consequently, the output of each of these circuits is applied as an input to an OR circuit 66 energizing the terminal 67 for energizing the data photosensors in one manner as described in connection with FIGURE 6 below. On the other hand, energization of either of the data photosensors C or K is indicative of the card being inserted in inverse position, i.e., upside down. Consequently, the outputs of C AND circuit 62 and K AND circuit 56 are applied as inputs to an OR circuit 68 producing a signal at a terminal 69 for control of the data photosensors in the manner described in FIGURE 6.

Referring to FIGURE 6, there are shown only the A and L data photosensors, as the circuitry for other opposite pairs of photosensors is the same as that illustrated in FIGURE 6. Light striking the A data photosensor may be produced by the passage of a card over the row of data photosensors with an opening formed either at the A or L position of the card. Signals at terminals 67 and 69 of FIGURE 5, indicating whether the card is inverted or not, are employed to energize terminals 67' and 69', respectively, of FIGURE 6 by switches (not shown) that are also under the control of the edge detector photosensors, as in the manner of FIGURE 4. This may be accomplished by the connection of data photosensor A and the terminal 67' to the input of an AND circuit 71 and the connection of data photosensor L and terminal 69' to the inputs of another AND circuit 72. After the first column of the punched card is passed over the row of data photosensors, the circuit of FIGURE 5 is fully operated, and if the card is right side up and an opening appears at location A, the AND circuit 71 will be energized to produce an output that is applied through an OR circuit 73 producing an output indicative of an A signal on that column of the card. If, on the other hand, the card has been inverted upon insertion in the reader, a punched opening at the A location in the second column, for example, will actually pass over the L data photosensor, but at the same time there will be produced a signal at the terminal 69 at FIGURE 5 indicating that the card is inverted. Consequently, both inputs of the AND circuit 72 will be energized to produce an output signal that is applied to the OR circuit 73 to thereby produce an A output signal. It will thus be seen that no matter whether the card is inserted right side up or face down, a punched opening at the A location of the second or succeeding columns of the data card will produce an A signal from the reader, which may then be fed to data handling equipment as a correct reading of the data upon the card. In a like manner, an opening punched at the L location in the second or succeeding column of the card, will produce an output signal from the L photosensor if the card is right side up, and this together with the signal from the face-up indicating terminal 67' are applied to an AND circuit 76. The output of this circuit is applied to the input of an OR circuit 77 to produce an L signal. In the inverted position of the card, this punched opening at the L position will actually pass over the A photosensor which is connected to one input of an AND circuit 78 having the other input connected to the terminal 69'. In the inverted position of the card the terminal 69' is energized, and thus the AND circuit 78 is operated to apply the output thereof to the OR circuit 77 and, consequently, produce an L output signal from the optical reader. It will be seen from the foregoing example that the reader produces the proper output signals whether the card is face up or face down. As previously noted, circuitry for data photosensors C and J is the same as that illustrated in FIGURE 6 for photosensors A and L, and, likewise, remaining corresponding opposite pairs of photosensors are connected in the manner shown in FIGURE 6.

It will be seen from the foregoing description of a preferred embodiment of the present invention that the optical reader hereof provides for positively gripping the punched or marked data cards and passing these cards in predetermined alignment through the reader without possibility of the card becoming askew during such passage and while holding the card flat against the transport bed of the reader. The optical reader hereof provides particular dimensional relationship between data photoreceptors and the size and positioning of punched openings or reflective markings upon a data card to further preclude the possibility of error arising from energization of an improper data photoreceptor. Gating of the photosensors of the present invention prevents the generation of spurious pulses or signals as may otherwise occur at the leading end or trailing edge of a card passed through the reader. The invention hereof further provides for indicating whether or not the card is inverted during passage through the reader and which end of the card first enters the reader. Not only does the invention provide for indicating the card orientation, but also provides for properly reading the card whatever the orientation.

The improved optical reader of the present invention removes much of the complexity of prior art readers, while at the same time materially increasing the capabilities of optical reading and the degree of freedom from error during reading. Although the present invention does not in itself provide for the manipulation of stored data, it does constitute an important link between data storage and retrieval thereof for data handling and manipulation. The freedom from error afforded by the present invention is in itself a major advance, and the capabilities of this invention to handle and properly read cards inserted in any manner is highly advantageous in data handling systems.

It is not intended to limit the present invention by the details of the accompanying drawings nor the terminology of the foregoing description, inasmuch as the present invention is only described and illustrated herein in connection with a single, preferred embodiment. Reference is made to the appended claims for a precise delineation of the true scope of this invention.

What is claimed is:

1. An optical card reader for data cards comprising a transport bed having side walls separated by substantially the width of the data cards, said transport bed being adapted to have data cards disposed longitudinally thereon for passage longitudinally thereof between its side walls, optical reading apparatus disposed adjacent to said transport bed and including at least one light source and light-responsive means for producing electrical signals representative of data indications upon the data cards as they are driven along a data reading zone of the transport bed, a pair of card drive means disposed above said transport bed and rotatably driven for engaging data cards disposed on the transport bed to move them past said optical reading apparatus, a first of said card drive means disposed toward the inlet end of said transport bed being rotated at a lesser surface velocity than the second of said card drive means disposed toward the outlet end of said transport bed to tension each data card flat against the transport bed in passage past said optical reading apparatus, light-responsive edge detection means disposed adjacent to said transport bed for enabling the light-responsive means of said optical reading apparatus to produce electrical signals only while a data card is being driven along the data reading zone of the transport bed, and light-responsive corner detection means disposed adjacent to one side of the transport bed toward the outlet end thereof to detect a missing corner of each data card, said edge and corner detection means including a pair of substantially aligned photosensors.

2. An optical card reader as set forth in claim 1, further defined by said first and second card drive means comprising first and second rollers disposed on opposite sides of said optical reading apparatus longitudinally of said transport bed, and a motor coupled to said first and second rollers for rotating the second roller toward the outlet end of the transport bed from the first roller at a slightly greater surface velocity than the first roller to thereby tension the data cards between the rollers and hold them flat upon the surface of the transport bed.

3. An optical reader as set forth in claim 1, further defined by a plurality of data apertures disposed in alignment laterally across the data reading zone of said transport bed and separate data photosensors for viewing the data cards through each of said data aperture and producing electrical signals in response to the presence of data indications on the data cards, said data apertures having a circular configuration with a diameter that is less than the width of the data indications upon the data cards.

4. An optical card reader as set forth in claim 1, further defined by said edge detection means comprising a pair of photosensors disposed in alignment longitudinally of said transport bed with one on each side of said alignment of data apertures, said pair of photosensors being electrically connected to turn on said data photosensors only when both edge detector photosensors are covered by a data card.

5. An optical card reader comprising a card transport bed with means for moving data cards longitudinally thereof and a transverse row of data photosensors viewing such cards through minute apertures, a light source energizing individual data photosensors corresponding to data indications in successive data columns of cards traversing said transport bed past the row of data photosensors, detection means comprising a corner detection photosensor disposed adjacent to the right side of the transport bed as viewed from the top in the direction of card transport and disposed toward the outlet end of the transport bed from said row of data photosensors to detect a missing corner of each data card, and a pair of edge detection photosensors communicating with the top surface of said transport bed through apertures disposed one on each side of said row of data photosensors longitudinally of the transport bed with the edge detection photosensor toward the outlet end of the transport bed being substantially aligned with the corner detection photosensor, said edge detection photosensors being electrically connected to energize the data photosensors only while a data card covers the row of data photosensors.

6. An optical card reader comprising a card transport bed, drive means above the bed and engaging a card placed thereon to pass the card along the bed through the reader, a light source above said bed, a plurality of data photosensors disposed in a row laterally across the bed and individually communicating with minute areas of the bed surface for producing electrical signals in response to data indications on a card passed along said bed, edge detection means including a pair of photosensors communicating with the bed surface one on each side of the row of data photosensors, switch means connected to and electrically energizing the data photosensors in response to a card fully covering said pair of edge detection photosensors, and coincidence circuitry connected to the edge detection photosensors and selected data photosensors far reversing the order of data signals from the raw of data photosensors upon card inversion and producing a control signal for descending card address upon card reversal.

7. An optical card reader as set forth in claim 6, further defined by said coincidence circuitry including a first AND circuit with a pair of inputs connected to said edge detection photosensors, a second AND circuit having one input connected to the output of said first AND circuit and another input connected to a first predetermined data photosensor, and a third AND circuit having one input connected to the output of said first AND circuit and another input connected to a second data photosensor, said first and second data photosensors being equally spaced on opposite sides of the centerline of the transport bed, and said second and third AND circuits producing signals identifying card orientation as to right side up and upside down in the reader.

8. An optical card reader as set forth in claim 7, further defined by the outputs of said second and third AND circuits being connected to energize first and second leads respectively, a first plurality of AND circuits having one input of each connected to said first lead and another input separately connected to a data photosensor, a second plurality of AND circuit having one input of each connected to said second lead and another input separately connected to a data photosensor, and a plurality of OR circuits with each having two inputs connected to a pair of AND circuits of the first and second pluralities that have inputs from data photosensors equally spaced on opposite sides of the centerline of the transport bed and that have outputs representing the same signals from card information with the card inserted right side up or upside down in the reader.

9. In an optical card reader having a transport bed with means for individually moving data cards along the transport bed past a transverse row of data photosensors viewing successive card columns through a plurality of apertures tuned on by a light source in accordance with data on the card, the improvement comprising a pair of edge detection photosensors disposed one on each side of the row of data photosensors out of lateral alignment with data positions on the cards and separated a distance slightly less than the distance from an end card edge and the first column of data positions, said edge detection photosensors being normally exposed to light to remain on in the absence of a card covering these photosensors, a corner detection photosensor aligned with one of said edge detection photosensors and disposed adjacent to one side of said transport bed to detect a missing corner of each data card and control circuitry connected to said edge detection photosensors and including switching means controlling electrical energization of the data photosensors to maintain the data photosensors electrically deenergized in the absence of a card covering the edge detection photosensors to prevent the production of signals by the data photosensors in the absence of a card in the reader in position to be read.

10. The improvement in optical card readers as set forth in claim 9, further defined by control circuitry including a plurality of AND circuits connected to a first predetermined pair of data photosensors and to a second corresponding pair of data photosensors, said first and second pairs of data photosensors being equally spaced on opposite sides of the transport bed centerline, each of the AND circuits also being connected to said edge detection photosensors to produce separate signals responsive to data located at predetermined positions in the first and last card columns, and output terminals coupled to said AND circuits whereby signals appear at different terminals according to card orientation as inserted in the reader.

11. An optical card reader comprising a transport bed, drive means for moving a card along the transport bed, data reading means including a light source and a plurality of data reading photosensors disposed in a row laterally across a data reading zone of the transport bed and being operable for producing electrical signals in response to data indications on a card moved along the data reading zone of the transport bed, edge detection means disposed adjacent to the transport bed for detecting the leading edge of the card as the card is driven along the data reading zone of the transport bed, and coincidence means connected to the edge detection means and to selected ones of the data reading photosensors disposed for detecting a position indication on the card, said coincidence means being operable for producing a first output signal indicating when the card is driven upside down along the data reading zone of the transport bed and a second output signal indicating when the card is driven backward along the data reading zone of the transport bed.

12. An optical card reader as in claim 11 wherein said coincidence means includes a first AND circuit having one input connected to said edge detection means and having another input connected to a first data reading photosensor, said first AND circuit having an output and producing an output signal indicating when the card is driven right side up along the reading zone of the transport bed, and said coincidence means also includes a second AND circuit having one input connected to said edge detection means and having another input connected to a second data reading photosensor, said first and second data reading photosensors being equally spaced on opposite sides of the centerline of the transport bed and said second AND circuit having an output and producing an output signal indicating when the card is driven upside down along the reading zone of the transport bed.

13. An optical card reader as in claim 12 including a first plurality of AND circuits each having one input connected to the output of said first AND circuit and having another input connected to a data reading photosensor, a second plurality of AND circuits each having one input connected to the output of said second AND circuit and having another input connected to a data reading photosensor, and a plurality of OR circuits each having a pair of inputs connected to a pair of AND circuits comprising one of said first plurality of AND circuits and one of said second plurality of AND circuits having inputs from data reading photosensors equally spaced on opposite sides of the center of the row of data reading photosensors, whereby the same data is obtained from the card whether it is driven right side up or upside down along the data reading zone of the transport bed.

References Cited

UNITED STATES PATENTS

| | | | |
|---|---|---|---|
| 2,288,770 | 7/1942 | Armbruster | 235—61.111 XR |
| 2,658,751 | 11/1953 | Jaeschke. | |
| 2,983,446 | 5/1961 | Zogg | 235—61.115 |
| 3,207,845 | 9/1965 | Swenson | 178—17 |
| 3,219,246 | 11/1965 | Kihara | 226—195 XR |
| 3,229,073 | 1/1966 | Macker et al. | 235—61.115 |
| 2,817,480 | 12/1957 | Baldwin | 235—61.7 |
| 2,848,535 | 8/1958 | Hunt | 235—61.115 XR |
| 2,921,736 | 1/1960 | Hatherell et al. | 235—61.115 |
| 3,076,599 | 2/1963 | Smith | 235—61.115 |

MAYNARD R. WILBUR, Primary Examiner

SOL SHEINBEIN, Assistant Examiner

U.S. Cl. X.R.

250—219